United States Patent
Richardson, IV

(10) Patent No.: US 6,523,838 B2
(45) Date of Patent: Feb. 25, 2003

(54) OUTBOARD MOTOR CADDY AND STAND

(76) Inventor: Donald V. Richardson, IV, 4304 Kilbourne Rd., Columbia, SC (US) 29206

( * ) Notice: Subject to any disclaimer, the term of this patent is extended or adjusted under 35 U.S.C. 154(b) by 0 days.

(21) Appl. No.: 09/755,314

(22) Filed: Jan. 3, 2001

(65) Prior Publication Data

US 2002/0084606 A1 Jul. 4, 2002

(51) Int. Cl.$^7$ ................................................ B60D 1/06
(52) U.S. Cl. ............................... 280/47.24; 280/47.27; 280/47.29
(58) Field of Search ..................... 280/47.24, 47.27, 280/47.28, 47.29, 13, 654, 655, 47.19, 79.11, 79.7, 79.3; 211/775

(56) References Cited

U.S. PATENT DOCUMENTS

| | | | |
|---|---|---|---|
| 2,658,703 A | * 11/1953 | Brink et al. | ............. 280/47.24 |
| 2,723,130 A | * 11/1955 | Andrews | ................. 280/47.19 |
| 2,723,863 A | * 11/1955 | Mattio | ..................... 280/47.24 |
| 2,817,436 A | * 12/1957 | Simpson | ..................... 211/175 |
| 2,843,393 A | 7/1958 | Dahlander, Sr. | |
| 2,860,887 A | 11/1958 | Stewart | |
| 2,901,261 A | 8/1959 | Olvey | |
| 2,903,147 A | 9/1959 | Davis, Jr. | |
| 3,041,084 A | 6/1962 | Stehman et al. | |
| 3,071,387 A | 1/1963 | Beaman et al. | |
| 3,177,001 A | * 4/1965 | Wolford | ................... 280/47.24 |
| 3,545,786 A | * 12/1970 | Yoder | ....................... 280/47.24 |
| 4,523,768 A | * 6/1985 | Dlubala | ................... 280/79.11 |
| 4,842,289 A | * 6/1989 | Samuels | .................. 280/47.19 |
| 5,033,759 A | * 7/1991 | Wix | ........................ 280/47.18 |
| 5,118,130 A | * 6/1992 | Kaltz | ....................... 280/47.29 |
| 5,123,803 A | 6/1992 | Crabtree | |
| 5,482,303 A | * 1/1996 | Meloy | ....................... 280/47.24 |
| 5,566,960 A | 10/1996 | McCrory | |
| 6,082,755 A | * 7/2000 | Topar | ....................... 280/47.27 |
| 6,095,531 A | * 8/2000 | Khachatoorian | ......... 280/47.27 |

* cited by examiner

Primary Examiner—Michael Mar
Assistant Examiner—Hau Phan
(74) Attorney, Agent, or Firm—Dority & Manning, P.A.

(57) ABSTRACT

An outboard motor caddy and stand that includes vertically extending uprights and vertically extending motor rails that are spaced from each other and connected by stabilizing bars extending diagonally from an upper portion of the vertically extending uprights to an intermediate portion of the motor support so as to distribute the load imparted by a motor and gas tank throughout the entire stand.

9 Claims, 2 Drawing Sheets

OUTBOARD MOTOR CADDY AND STAND

BACKGROUND OF THE INVENTION

The present invention relates to an outboard motor caddy and stand and more particularly to a caddy and stand wherein an outboard motor can be transported as well as tested.

Heretofore stands and caddies have been provided for supporting and transporting outboard motors. One problem with such stands is that they have not been stable and would often tilt over. Another problem with such prior art stands is that it was difficult to readily mount a motor on the back thereof while allowing ready access to the foot of the motor so that a hose can be connected to the foot of the motor for test running the motor.

SUMMARY OF THE INVENTION

The present invention relates to an outboard motor and caddy stand wherein an outboard motor can be readily supported on the stand in an upright position while exposing its controls as well as the foot thereof so that a hose can be readily attached for test running the outboard motor. The motor and stand includes a vertically extending upright which has wheels carried adjacent the lower end thereof. The upright has a handle portion adjacent the top thereof which permits a person to readily grasp and tilt the caddy so that such can be pulled. A vertically extending motor support rail is spaced from the vertically extending upright and has a horizontally extending mount carried adjacent an upper end thereof. Stabilizing bars extend diagonally from an upper portion of the vertically extending upright to an intermediate portion of the motor support rails for stabilizing the caddy and transferring the forces imparted by the weight of the motor uniformly throughout the caddy. A gas tank support frame extends between a lower portion of the vertically extending uprights and the vertically extending motor support for supporting a gas tank offset from the center of gravity of the motor. As a result, when the gas tank is positioned on the caddy along with the motor, it aids in holding or stabilizing the entire system in an upright position. Positioned adjacent the lower ends of the vertical motor support rails are screw-in height adjusters for leveling the caddy when it is in a vertically extending upright position.

Accordingly, it is an object of the present invention to provide a simple and stabilized caddy for transporting outboard motors.

Another important object of the present invention is to provide a simple outboard motor caddy and stand that can be used for both transporting and test operating outboard motors.

The accompanying drawings, which are incorporated herein constitute a part of this specification and illustrate one embodiment of the invention, and together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

DETAILED DESCRIPTION OF THE PREFERRED EMBODIMENT

Figure 1:
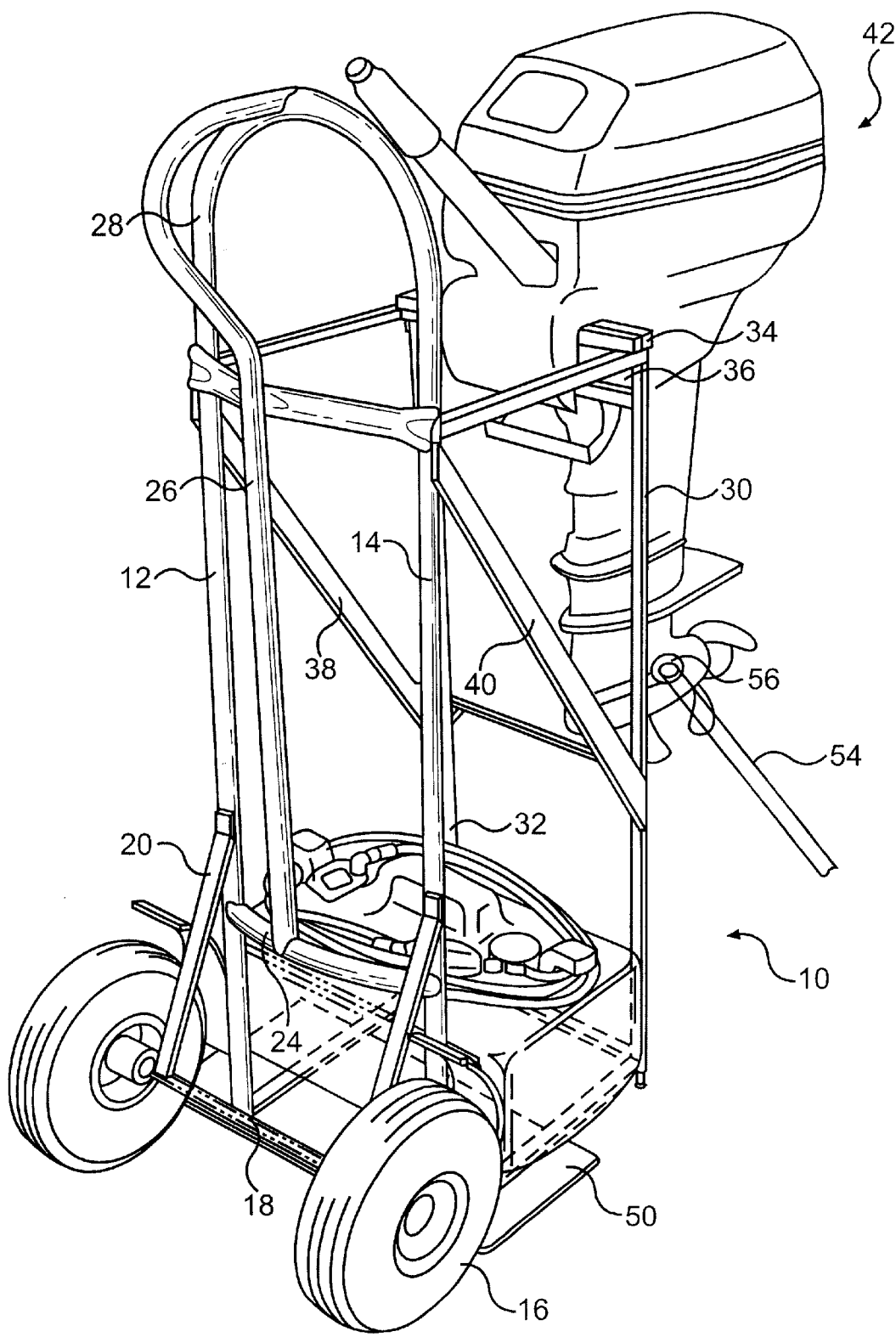
FIG. 1 is a perspective view taken from the right rear of one embodiment of an outboard motor caddy and stand.
Figure 2:
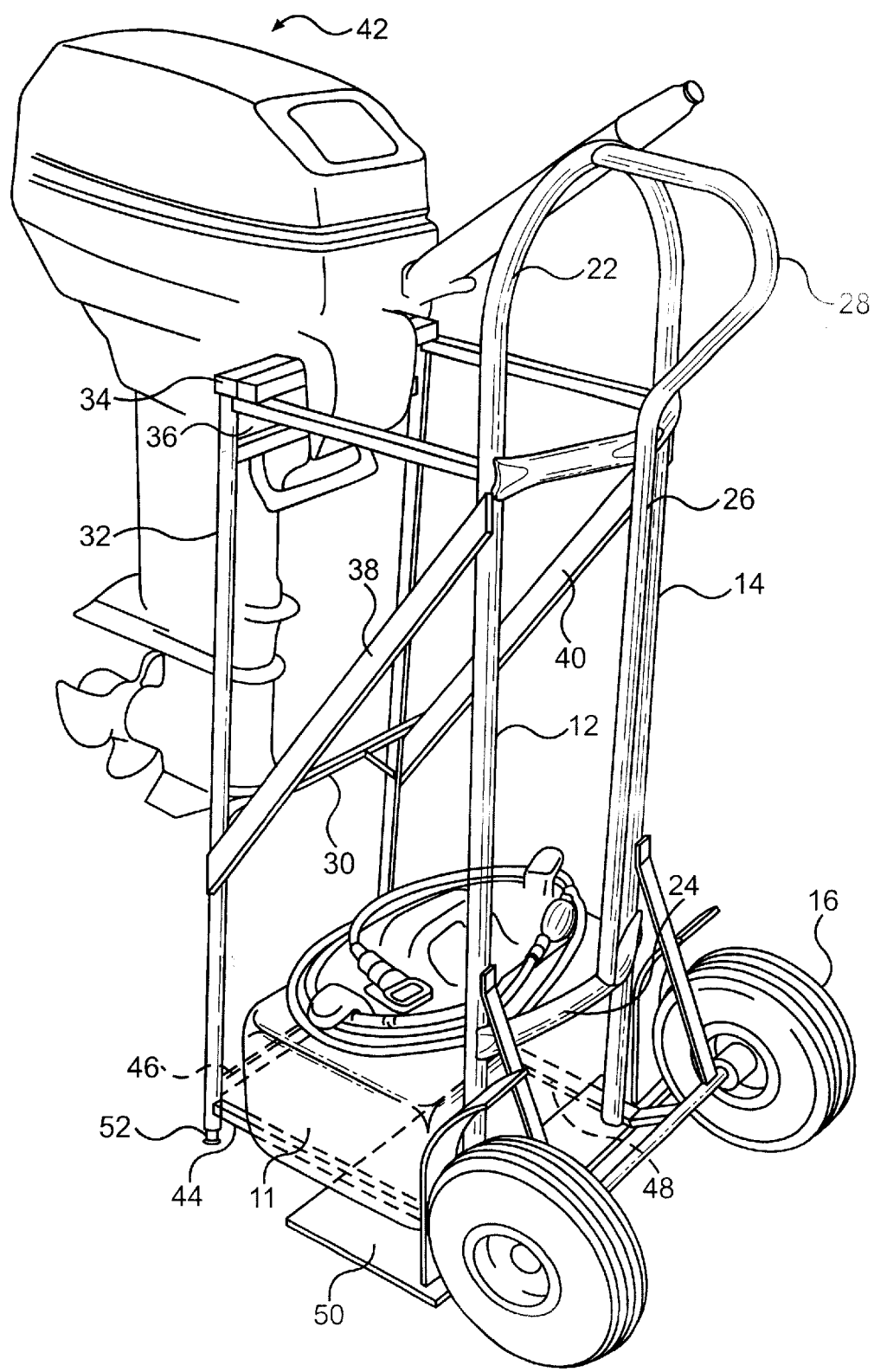
FIG. 2 is a perspective view taken from the other side of the embodiment shown in FIG. 1.

Reference now is made to the drawings which illustrate a preferred embodiment of the invention. As seen in FIG. 1 of the drawing, there is illustrated an outboard motor caddy and stand generally designated by the reference character 10 which is provided for supporting and transporting a motor 42 and gas tank 11. This stand includes a pair of vertically extending uprights 12 and 14 that are spaced apart from each other. Wheels 16 are carried on an axle 18 which is supported on bracing 20 adjacent the lower end of the vertically extending uprights. A handle portion 22 is carried adjacent the upper portion of the vertically extending uprights 12 and 14 and joins the two upright ends in an arcuate frame. Another arcuate shaped frame 24 is provided for joining the lower ends of the vertically extending uprights. Position between the arcuate frame 24 and the handle 22 is a support bar 26 that is provided for supporting the stand in a horizontal position when the stand is lying flat. A protruding portion of the support bar 28 extends rearwardly so that its outermost point is in alignment with the edges of the wheel 16 to maintain the stand in a level horizontal position when it is laid down.

Vertically extending motor support rails 30 and 32 are spaced from the vertically extending uprights 12 and 14. A horizontally extending motor support mount 34 extends between the upper ends of the rails 30 and 32 upon which a motor can be mounted. Normally, the horizontally extending motor mount includes a pair of horizontal bars and a vertically extending wooden or metal block 36 to which screws forming part of the motor mount can be tightened against. Stabilizing bars 38 and 40 extend from an upper portion of the vertically extending uprights 12 and 14 to a lower portion of the vertically extending motor support rails 30 and 32. These stabilizing bars enable an outboard motor, such as is identified by the reference character 42, to be mounted on the horizontal extending motor mount 34 while distributing the load of the weight of the motor throughout the entire caddy. Such enables the motor to be transported on the caddy and test run while securely mounted on the caddy.

A gas tank support frame is provided adjacent the lower end of the caddy and includes horizontally extending bars 44, 46 and 48 which connect the lower ends of the vertically extending motor support rails 30 and 32 to the vertically extending uprights 12 and 14.

Positioned directly below the gas tank support frame is a horizontally extending lift plate 50 which is a part of a conventional lift truck that includes the wheels 16, the vertically extending uprights 12 and 14 and the handle portion 22. The conventional lift truck has been modified by adding the additional structure to produce a more stable outboard motor caddy and stand. Adjustable screws 52 are provided in the lower end of the motor support rails 30 and 32 so that by rotating the screws which rest on the ground the stand can be leveled to hold the motor at a proper orientation so that such can be cranked and tested.

When it is desired to crank the motor, a water hose 54 is attached to a water connecting attachment 56 that fits around the lower end of the foot of the motor so that water can be supplied to the motor when it is run.

Horizontally extending offset braces 57 and 59 are positioned between upper portions of the vertically extending uprights 12 and 14 and the upper portions of the support rails 30 and 32.

As a result of offsetting the horizontally extending motor mount 34 from the frame of the lift truck, it enables the motor to be easily placed onto the motor mount 34 without any interfering structure. It also provides a more stable stand which is more difficult to tilt over when the motor is cranked during test running or cleaning salt water therefrom.

While a preferred embodiment of the invention has been shown and described, it should be understood that any and all equivalent realizations of the present invention are included within the scope and spirit thereof. The embodiment as shown merely shows one example of the invention and is not intended as limitations upon the present invention. It is to be understood that other modifications and variations of the support structure can be made without departing from the spirit and scope of the invention.

What is claimed is:

1. An outboard motor caddy and stand comprising:
   hand truck structure comprising:
      vertically extending uprights, including upper and lower portions;
      wheels carried adjacent said lower portions of said vertically extending uprights;
      a handle portion carried adjacent an upper portion of said vertically extending uprights;
      a lift plate extending transversely from a lowermost portion of said vertically extending uprights; and rigidly connected there to
   motor support structure rigidly connected to said hand truck structure and comprising:
      vertically extending motor support rails spaced from and essentially parallel to said vertically extending uprights;
      a horizontally extending motor mount carried by and supported on top of said vertically extending support rails, said motor mount comprising a vertically extending dimension defining a surface against which a mount of an outboard motor is engageable for securing an outboard motor to said motor caddy and stand in an essentially vertically position;
      horizontally extending offset braces extending between upper portions of said vertically extending uprights and upper portions of said vertically extending motor support rails;
      stabilizing bars extending downwardly from an upper portion of said vertically extending uprights to an intermediate portion of said motor support rails; a lower
      a gas tank support frame disposed above said lift plate and extending between a lower portion of said vertically extending uprights and said vertically extending motor support rails whereby an outboard motor and gas tank can be readily supported on said outboard motor caddy for test running and transporting.

2. The combination outboard motor caddy and stand as set forth in claim 1 further comprising:
   vertical height adjustment screws carried at a lower end of said vertically extending motor support rails for leveling said motor caddy.

3. The combination outboard motor caddy and stand as set forth in claim 2 further comprising:
   a support bar carried adjacent to said handle portion extending rearwardly to maintain the stand in a level horizontal position when it is laid down.

4. The combination outboard motor caddy and stand as set forth in claim 2 further comprising:
   a support bar carried adjacent to said handle portion extending rearwardly to maintain the stand in a level horizontal position when it is laid down.

5. The combination outboard motor caddy and stand as set forth in claim 1, wherein said horizontally extending motor mount comprises a pair a spaced apart parallel bar members and a block member mounted between said bar members so as to define said surface against which the outboard motor mount engages.

6. An outboard motor caddy stand comprising:
   hand truck structure further comprising:
      vertically extending uprights, including an upper and lower portion;
      wheels carried adjacent said lower portions of said vertically extending uprights;
      a handle portion carried adjacent an upper portion of said vertically extending uprights;.
      a lift plate extending transversely from a lowermost portion of said vertically extending uprights and rigidly connected thereto;
   motor support structure rigidly connected to said hand truck structure and further comprising:
      vertically extending motor support rails spaced from and essentially parallel to said vertically extending uprights;
      horizontally extending offset braces extending between said upper portion of said vertically extending uprights upper portion and said vertically extending motor support rails
      horizontally extending offset braces extending between lower portions of said vertically extending uprights and lower portions of said vertically extending motor support rails;
      stabilizing bars extending diagonally from an upper portion of said vertically extending upright to a lower intermediate portion of said motor support rails; and
      a horizontally extending motor mount carried by said vertically extending support rails, and extending at least in part above said horizontally extending offset braces said motor mount comprising a vertically extending dimension defining a surface against which a mount of an outboard motor is engageable at a position vertically displaced from a top edge of said motor mount for securing an outboard motor to said motor caddy and stand in an essentially vertical position.

7. The combination outboard motor caddy and stand as set forth in claim 6 further comprising:
   a base plate extending forwardly from vertically extending uprights and engaging the ground for aiding in stabilizing said motor caddy and stand when supporting an outboard motor.

8. The combination outboard motor caddy and stand as set forth in claim 7 further comprising:
   vertical height adjustment screws at lower end of said vertically extending motor support rails for leveling said motor caddy and stand when supporting an outboard motor.

9. The combination outboard motor caddy and stand as set forth in claim 6, wherein said horizontally extending motor mount comprises a pair a spaced apart parallel bar members and a block member mounted between said bar members so as to define said surface against which the outboard motor mount engages.

* * * * *